Patented Nov. 13, 1934

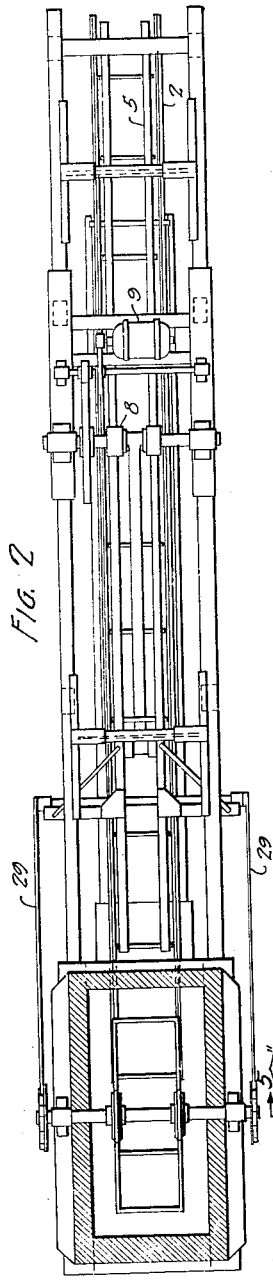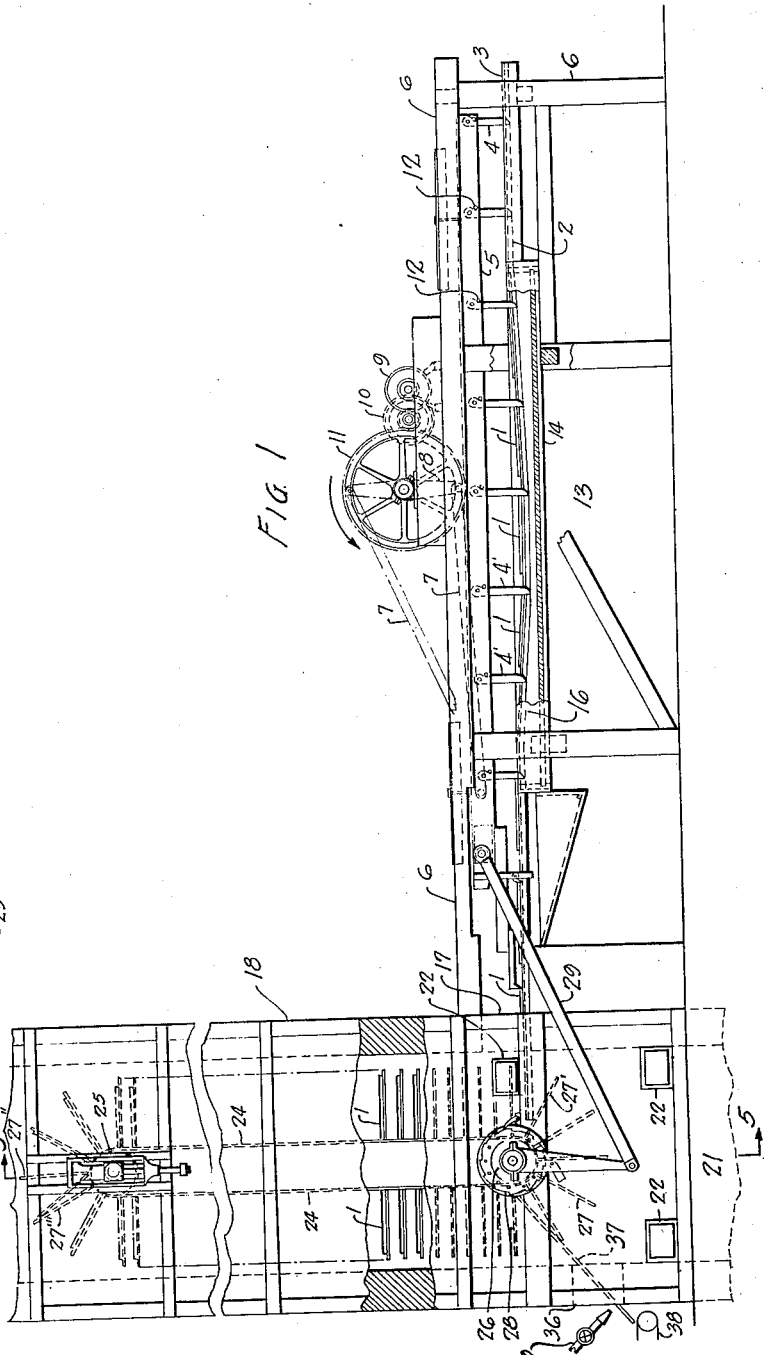

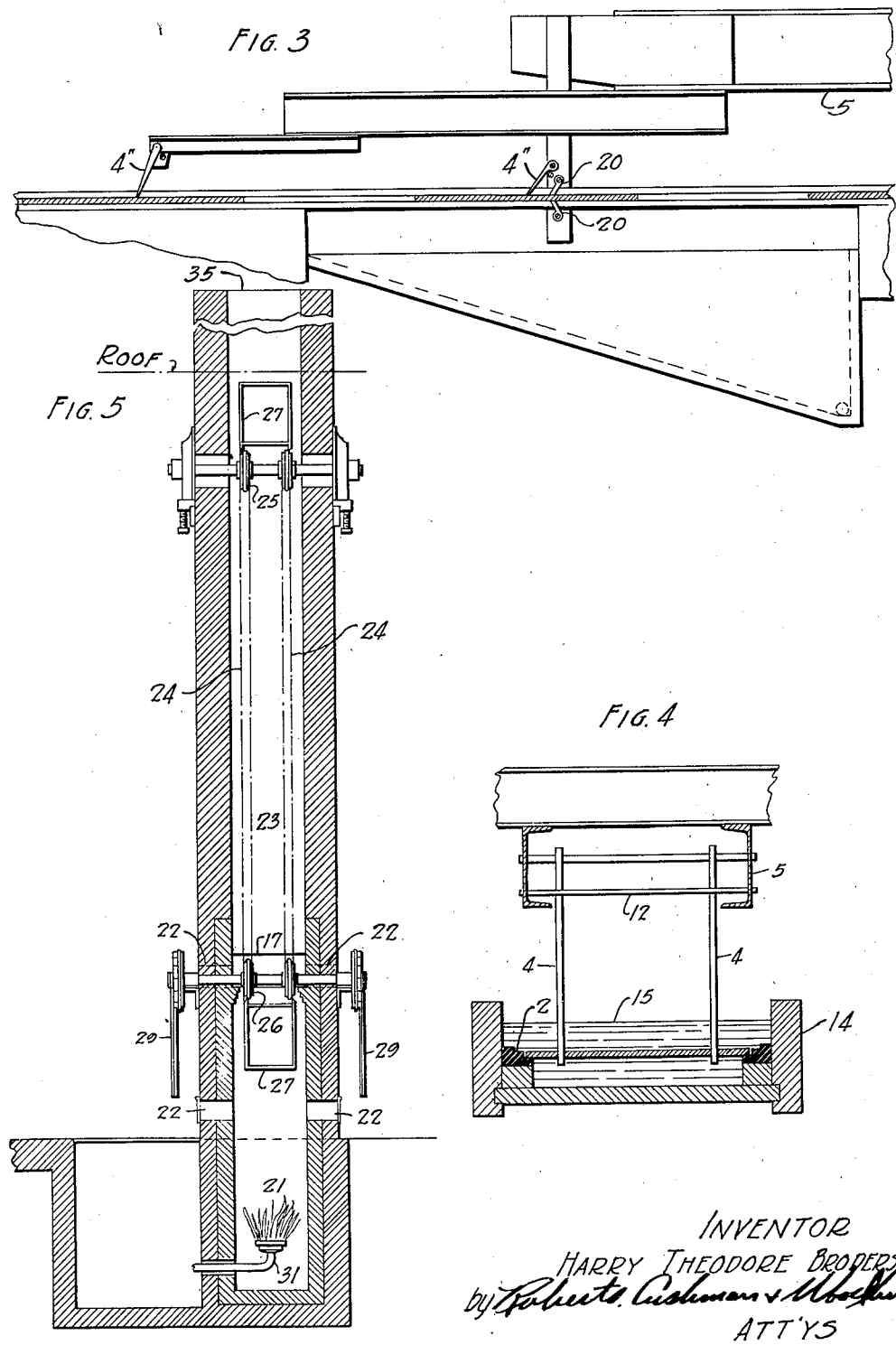

1,980,905

UNITED STATES PATENT OFFICE 1,980,905

METHOD OF COLORING SHEET MATERIALS

Harry Theodore Brodersen, Pittsburg, Calif., assignor to Johns-Manville Corporation, New York, N. Y., a corporation of New York Application May 13, 1930, Serial No. 452,109

4 Claims. (Cl. 91—70)

This invention relates to a method of coloring sheet materials, made of calcareous materials, such as cement bonded asbestos and the like, and to the resulting product.

An object of the invention is to provide a method of coloring cementitious surfaces and especially those which are subsequently to be subjected to weathering, such as shingles, so that they shall be resistant to conditions of storage and ultimate use, and substantially free from bloom. It is also an object to render the coloration fast so that it will not be subject either to bleaching or to leaching out and diffusion over the treated surface. Other objects will appear from the following disclosure.

In accordance with the method of the invention, the cementitious surface is preferably permitted to set, either partially or completely, and is then treated in any suitable way with a solution of a salt of a metal which forms an oxide or hydroxide of the desired color; the wet surface is then subjected to a high local temperature, such as a direct flame or other means of producing a high temperature, then dried, and finally subjected to a stream of hot wash water or steam or both to rinse off undissolved salts of any kind. The high temperature and gases, at this stage, facilitate the conversion of the absorbed salt or salts into insoluble compounds either by decomposition or by reaction with the alkaline constituents of the cementitious surface or both, and the final treatment with steam completes such reaction while assisting the drying and fixing of the same upon and within the cementitious material. Upon drying, the surface exhibits the color or colors of the insoluble metal compounds thus produced and is substantially permanent, both in composition and appearance. It is to be understood that salts which are susceptible to hydrolysis to form sufficiently insoluble basic salts are likewise suitable.

Shingles made in this way accordingly have the desired coloration, either uniformly distributed or varied, substantially in accordance with the application of the salt solution. Moreover the coloration is rendered insoluble and fast—both to water and to light—and any tendency to diffuse or to produce further blooming is nullified.

The final product is, moreover, of a definite chemical composition and color, inasmuch as the heating of the impregnated shingle accelerates the chemical reaction and carries it to substantial completion, thus eliminating side reactions or subsequent continuation of the main reaction between residual traces of the reagent materials which might otherwise remain.

A typical instance of the application of the invention will be described with respect to asbestos shingles made of asbestos fiber and bonded with Portland cement, reference being made to the accompanying drawings, in which:

Fig. 1 is a side elevation of apparatus suitable for carrying out the invention as applied to shingles or the like;

Fig. 2 is a plan view of the same;

Fig. 3 is a detail side elevation of a part of the feeding mechanism;

Fig. 4 is a detail cross section of a part of the feeding mechanism;

Fig. 5 is a cross section and end view on line 5—5 of Fig. 1.

The shingles may be made in accordance with usual practice, as by mixing asbestos fibers with Portland cement and water, shaping, compressing, and either causing the same to set or merely drying to a sufficient strength to permit of convenient handling.

In this condition, the shingles 1, 1, may be fed onto table (or track) 2, as at one end 3, where they are engaged, as by resilient rubber fingers 4, 4', 4'', which are suspended from a slide 5 mounted horizontally upon a stationary support or frame 6. The slide 5 is reciprocally driven as by the arm 7 on the crank 8 from any suitable source of power, such as the motor 9 and gears 10, 11.

The fingers 4, 4', 4'' are pivoted to the slide 5 to swing freely over the shingles 1, on the return stroke but are arrested by stops 12, upon the forward stroke, so that they firmly engage the shingles 1, 1, and urge the same forward along the table 2. The middle portion of the table 2, as at 13, dips into a trough 14, containing the treating solution 15 which may, for example, be prepared from ferric chloride and water and have a concentration of from 15% to 30%, depending upon the depth of coloration desired.

The shingles are thus saturated with the ferric chloride solution, and are then advanced upon the table 2 to the upwardly inclined exit end 16 where the excess of solution flows from the shingles and back into the tank, urged, if desired, by wipers 20.

As the saturated shingles pass from the end 16, they enter through opening 17 into heating chamber 18 which, as shown in Figs. 1, 2 and 5, comprises a fire box 21 having air ports 22, and opening into a vertical tower-shaped heating chamber having a vertical elevator 23, including an endless chain or belt 24 mounted upon pulleys 25 and 26 and carrying horizontal arms or shelves 27. The pulleys 25 are driven by a pawl and ratchet 28, through lever 29, which in turn is connected to the slide 5.

The fire box 21 is provided with oil burner 31, the length of the flames from which may be controlled to reach or stop short of the entrance opening 17 as desired (according to the oil feed) and may be of a reducing nature or combined with admixture of air, by closing or opening the ports 22, respectively.

By spacing the fingers 4, 4 apart by a distance approximately equal to the length of each shingle, and adjusting the pawl and ratchet arrangement 28 accordingly, the feeding apparatus and elevator synchronize so that as each shingle 1, 1, is introduced through opening 17, a shelf 27 of the elevator stands opposite the opening ready to receive it; and upon retraction of the slide 5 and arm 29 to engage the next shingle, the loaded shelf 27 is raised and the next shelf 27' is brought into position before the opening 17.

At this point, the freshly inserted shingle is met by a blast of hot air (and flame) from the fire box 21, which heats the salt solution contained in and upon the shingle, thereby promoting its reactivity so that the metal salt (e. g., ferric chloride) is decomposed both by the water of solution and by reaction with the alkaline components of the shingle to produce insoluble, colored basic salts such as ferric hydroxide or ferric oxide. As the elevator raises the shingle upward, the latter is surrounded by hot, drying, oxidizing or reducing gases, whereupon the shingle is dried, the water vapor and cool gases being vented at 35.

As the shelf (27'') reaches the topmost position, the shingle carried by it falls forward upon the upper side of the preceding shelf 27''', upon which it is lowered to the exit opening 36, through which it slides by gravity upon the guideway 37, to an offtake belt 38, or the like.

As the shingle approaches the exit 36 it again comes into the hot zone of flames and gases from the fire box 17, whereupon its other side is exposed to the high temperatures and oxidizing effects, similar to those to which it was subjected upon entering the heating chamber.

The period of heating, decomposing the metallic salt and drying may be regulated in part by the height of the heating chamber and also by the speed at which the elevator is operated. The temperature of treatment is controlled primarily by the operation of burner 31, the length of flame, and the opening or closing of the air ports 22, and may vary from 100° C. to 700° or 800° C. or more (e. g., 400° C.). The condition of the shingle as it enters the heating chamber may also be governed by adjusting the depth of the solution 15 (e. g., at 13, so as to completely submerge the shingle or to wet or saturate one side only) and by regulating the distance between the tank and the entrance to the heating chamber at 17, in which it is allowed to drain and to dry somewhat. The effect of the heating treatment at the exit opening 36 may also be influenced by the temperature to which the shingle has been heated, condition of dryness, and speed at which it passes through this zone, in view of the particular salt employed. The shingle may then be subjected to a blast of hot water or steam or both, as from a jet 39, which serves not only to dissolve and wash away any residual salt which has not been rendered insoluble but also to effect such conversion or to complete such as has already been initiated by the previous treatment, so that the shingle, as ultimately produced, is substantially free from soluble salts and the insoluble compounds are carried into intimate association with the body of the shingle so that they are not subject to subsequent dissolution or displacement during storage, handling or in use. The coloration produced is consequently strong and permanent, substantially proportionate in depth to the amount and concentration of the solution used, and uniformly distributed. Variations in distribution may be effected by applying the solution irregularly over the surface of the shingles or to form a pattern thereon, in well known ways.

I claim:

1. Method of coloring cementitious sheet materials containing water soluble alkaline constituents which comprises the step of treating the same after setting with a solution containing a decomposable compound of a metal, the oxide or hydroxide of which is insoluble and of the desired color, subjecting the wet sheet to a high temperature to decompose said compound and form said oxide or hydroxide, subsequently drying and thereafter rinsing the thus treated surface.

2. Method of coloring cementitious sheet materials containing water soluble alkaline constituents which comprises the step of treating the same after setting with a solution containing a decomposable compound of a metal, the oxide or hydroxide of which is insoluble and of the desired color, subjecting the wet sheet to a high temperature to decompose said compound and form said oxide or hydroxide, subsequently drying, and thereafter rinsing the thus treated surface with hot water and steam.

3. Method of coloring cementitious sheet materials containing water soluble alkaline constituents which comprises the step of treating the same after setting with a solution containing a decomposable compound of a metal, the oxide or hydroxide of which is insoluble and of the desired color, and subjecting the wet sheet to a temperature of about 400° C.

4. Method of coloring cementitious materials containing water soluble alkaline constituents therein, which comprises the steps of treating the same after setting with a solution containing a salt of a suitable metal, decomposing the same to form an oxide or hydroxide of the desired color, subjecting the wet sheet to a high temperature, drying, and thereafter heating the sheet and dehydrating said hydroxide.

HARRY THEODORE BRODERSEN.